United States Patent
Nakayabu et al.

(10) Patent No.: US 10,583,460 B2
(45) Date of Patent: Mar. 10, 2020

(54) METHOD FOR FORMING MULTILAYER COATING FILM

(71) Applicant: KANSAI PAINT CO., LTD., Hyogo (JP)

(72) Inventors: Takashi Nakayabu, Tochigi (JP); Kazushi Konishi, Kanagawa (JP); Kohei Onishi, Kanagawa (JP); Masuo Kondo, Saitama (JP); Keisuke Kojima, Saitama (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/715,257

(22) Filed: Sep. 26, 2017

(65) Prior Publication Data
US 2018/0104718 A1 Apr. 19, 2018

(30) Foreign Application Priority Data

Oct. 13, 2016 (JP) .................. 2016-201783

(51) Int. Cl.
| | |
|---|---|
| *B05D 7/00* | (2006.01) |
| *C09D 5/00* | (2006.01) |
| *B05D 3/00* | (2006.01) |
| *C09D 175/04* | (2006.01) |
| *C09D 167/00* | (2006.01) |
| *C08G 18/42* | (2006.01) |
| *C08G 18/80* | (2006.01) |
| *C08G 18/62* | (2006.01) |
| *C08G 18/40* | (2006.01) |
| *C08G 18/79* | (2006.01) |
| *C09D 17/00* | (2006.01) |
| *C09D 133/08* | (2006.01) |
| *C09D 133/14* | (2006.01) |
| *C09D 167/02* | (2006.01) |
| *C08K 3/22* | (2006.01) |

(52) U.S. Cl.
CPC ............. *B05D 7/572* (2013.01); *B05D 3/007* (2013.01); *C08G 18/4063* (2013.01); *C08G 18/4263* (2013.01); *C08G 18/6254* (2013.01); *C08G 18/6283* (2013.01); *C08G 18/6291* (2013.01); *C08G 18/792* (2013.01); *C08G 18/807* (2013.01); *C09D 5/002* (2013.01); *C09D 17/008* (2013.01); *C09D 133/08* (2013.01); *C09D 133/14* (2013.01); *C09D 167/00* (2013.01); *C09D 167/02* (2013.01); *C09D 175/04* (2013.01); *B05D 2201/00* (2013.01); *B05D 2202/00* (2013.01); *C08K 2003/2241* (2013.01)

(58) Field of Classification Search
CPC .... B05D 7/572; B05D 3/007; C08G 18/4263; C09D 133/08; C09D 5/002; C09D 175/04
See application file for complete search history.

(56) References Cited

U.S. PATENT DOCUMENTS

| | | | |
|---|---|---|---|
| 2001/0012543 A1* | 8/2001 | Watanabe | C09D 5/44 427/458 |
| 2006/0014024 A1* | 1/2006 | Itakura | C08G 18/289 428/423.1 |
| 2007/0023288 A1* | 2/2007 | Kuwano | B05D 7/572 204/486 |

FOREIGN PATENT DOCUMENTS

| | | |
|---|---|---|
| JP | 1-288372 | 11/1989 |
| JP | 04-122474 | 4/1992 |
| JP | 2011-20104 | 2/2011 |

* cited by examiner

*Primary Examiner* — Francisco W Tschen
(74) *Attorney, Agent, or Firm* — Wenderoth, Lind & Ponack, L.L.P.

(57) ABSTRACT

Provided is a method for forming a multilayer coating film giving excellent low temperature impact resistance to a substrate that comprises a metal material and a plastic material. The method for forming a multilayer coating film comprises sequential steps of forming an uncured primer coating film, an uncured first colored coating film, an uncured second colored coating film and an uncured clear coating film on a substrate; and heating the same so as to simultaneously cure these 4 coating films, wherein the aqueous first colored paint and aqueous second colored paint are each a 1-package type paint composition containing a specific hydroxyl group-containing resin and a specific blocked polyisocyanate compound.

2 Claims, No Drawings

METHOD FOR FORMING MULTILAYER COATING FILM

TECHNICAL FIELD

The present invention relates to a method for forming a multilayer coating film, the method enabling formation of a multilayer coating film giving excellent low temperature impact resistance both to a metal member and a plastic member.

BACKGROUND ART

In general, an automobile body has metal members that form the body and plastic members that form bumpers and the like.

When coating such automobile bodies in the past, it was commonly adopted for the metal members and plastic members to be coated using different paints and different coating processes that were suitable for the respective members, after which the plastic members were fitted to the metal members.

In recent years, however, there has been a demand for methods for carrying out coating in a state whereby plastic members are already fitted to metal members in order to lower equipment costs in automobile body production processes and harmonize color tones between metal members and plastic members.

For example, PTL 1 discloses a method for coating an automobile outer panel part, which is characterized by assembling metal members, which have been electrodeposited in advance with a cation type electrodeposition paint, and plastic members so as to obtain an automobile outer panel part, coating both types of member with an aqueous barrier coat containing a composition comprising an olefin-based resin and a urethane-based resin as a primary automobile component, then applying an intermediate paint if necessary, and then applying a top paint. In addition, PTL 2 discloses a method for forming a coating film, which is characterized by integrally assembling a metal member, which has been subjected to electrodeposition painting, and a plastic member, coating the surfaces of both members with a solvent-based paint which contains an isocyanate-modified polybutadiene resin, a polyol component having a number average molecular weight of 150 to 50,000 and an electrically conductive filler as primary components and which can form a coating film having a static glass transition temperature of $-100°$ C. to $0°$ C., then applying an intermediate paint if necessary, and then applying a top paint. However, these coating methods cannot be said to be satisfactory in terms of impact resistance of an obtained multilayer coating film in a low temperature environment ($-30°$ C.).

With regard to ensuring physical properties in low temperature environments, PTL 3 discloses a method for forming a multilayer coating film in which an electrodeposition coating film, an intermediate coating film, a base coating film and a clear coating film are sequentially laminated on a substrate and in which the clear coating film has a tensile strength of 60 MPa or more and a breaking elongation rate of 5% or more at $-20°$ C., but this method is not suitable for substrates having both metal members and plastic members and is insufficient in terms of impact resistance in a $-30°$ C. environment.

CITATION LIST

Patent Literature

PTL 1: Japanese Patent Application Publication No. H04-122474

PTL 2: Japanese Patent Application Publication No. H01-288372

PTL 3: Japanese Patent Application Publication No. 2011-020104

DISCLOSURE OF THE INVENTION

With these circumstances in mind, the purpose of the present invention is to provide a method for forming a multilayer coating film, by which it is possible to form a multilayer coating film having excellent low temperature impact resistance on a metal member or a plastic member.

As a result of diligent research in order to achieve this purpose, the inventors of the present invention found that the problems mentioned above could be solved by means of a method for forming a multilayer coating film by sequentially applying a primer paint (P), and aqueous first colored paint (X), an aqueous second colored paint (Y) and a clear paint (Z) on a substrate that contains a metal material and a plastic material, and then heating the thus formed uncured primer coating film, uncured first colored coating film, uncured second colored coating film and uncured clear coating film so as to simultaneously cure these 4 coating films, wherein the aqueous first colored paint (X) is a 1-package type paint composition containing a hydroxyl group-containing resin (X1) and a blocked polyisocyanate compound (X2), the aqueous second colored paint (Y) is a 1-package type paint composition containing a hydroxyl group-containing resin (Y1) and a blocked polyisocyanate compound (Y2), and the clear paint (Z) is a 2-package type paint composition which contains a hydroxyl group-containing resin (Z1), an aliphatic polyisocyanate compound and/or a derivative thereof (Z2), and a non-aqueous polymer dispersion liquid (Z3) having a hydroxyl value of substantially 0 mg KOH/g in a specific ratio, and thereby completed the present invention.

Thus, the present invention provides a method for forming a multilayer coating film by sequentially carrying out, in order:

(1) a step of applying a primer paint (P) on a substrate that comprises a metal material and a plastic material so as to form an uncured primer coating film;

(2) a step of applying an aqueous first colored paint (X) on the uncured primer coating film obtained in step (1) so as to form an uncured first colored coating film;

(3) a step of applying an aqueous second colored paint (Y) on the uncured first colored coating film obtained in step (2) so as to form an uncured second colored coating film;

(4) a step of applying a clear paint (Z) on the uncured second colored coating film obtained in step (3) so as to form an uncured clear coating film; and (5) a step of heating the uncured primer coating film, the uncured first colored coating film, the uncured second colored coating film and the uncured clear coating film formed in steps (1) to (4) so as to simultaneously cure these 4 coating films, wherein the method for forming a multilayer coating film is characterized in that the aqueous first colored paint (X) is a 1-package type paint composition containing a hydroxyl group-containing resin (X1) and a blocked polyisocyanate compound (X2), and the aqueous second colored paint (Y) is a 1-package type paint composition containing a hydroxyl group-containing resin (Y1) and a blocked polyisocyanate compound (Y2), and the clear paint (Z) is a 2-package type paint composition which contains a hydroxyl group-containing resin (Z1) having a hydroxyl value of 80 to 150 mg KOH/g, an aliphatic polyisocyanate compound and/or a derivative thereof (Z2), and a non-aqueous polymer dispersion liquid (Z3) having a hydroxyl value of substantially 0 mg KOH/g, and in which the solid content proportion in the non-aqueous polymer dispersion liquid (Z3) falls within a range of 20 to 30 mass % of the total quantity of solid content of the hydroxyl group-containing resin (Z1) and the aliphatic polyisocyanate compound and/or a derivative thereof (Z2), and a ratio of isocyanate groups to hydroxyl groups (NCO/OH) falls within a range of 0.9 to 1.2.

According to the method for forming a multilayer coating film of the present invention, it is possible to form a multilayer coating film giving excellent impact resistance both to a metal member and a plastic member on a substrate containing a metal material and a plastic material even in a low temperature environment at −30° C.

DESCRIPTION OF THE PREFERRED EMBODIMENTS

The method for forming a multilayer coating film of the present invention will now be explained in detail.

Step (1)

In step (1) in the present invention, a primer paint (P) is applied on a substrate that contains a metal material and a plastic material. The substrate is not particularly limited, but can include, for example, automobile components and the like, such as automobile outer panel parts, bumpers, and the like, of passenger cars, trucks, motorcycles, buses, and the like.

Metal members include, for example, iron, aluminum, brass, copper, tin plate, stainless steel, zinc-plated steel, zinc alloys (for example, Zn—Al, Zn—Ni, Zn—Fe and the like)-plated steel and the like.

The surface of these metal members may be subjected to a surface treatment such as a phosphate treatment, chromate treatment and composite oxide treatment, and an undercoat film may be formed on the surface by means of an undercoat material. Undercoat materials include, for example, electrodeposition paints, and among these, cationic electrodeposition paints are preferred.

For example, polyolefins obtained by (co)polymerizing one or two or more olefins having 2 to 10 carbon atoms, such as ethylene, propylene, butylene or hexene, are particularly suitable as the material of the plastic member, but polycarbonates, ABS resins, urethane resins, polyamides, and the like, can also be used. These plastic members include, for example, automobile outer panel parts such as bumpers, spoilers, grilles and fenders; and outer panel parts of domestic appliances. Before applying the primer paint (P), these plastic members may be subjected to a degreasing treatment, a water washing treatment, or the like, as appropriate using an already known method.

The substrate is constituted so that both materials are contained at least partially in a coated surface or surface of the substrate, and the manner in which these materials are contained and the content ratios thereof are not particularly limited. However, it is preferable for 20% or more of such surfaces to be constituted so that the metal material and plastic material account for 5% to 95% and 95% to 5% respectively.

The metal member and plastic member may be assembled using an already known method.

Primer Paint (P)

The primer paint (P) is preferably an aqueous paint used mainly in order to impart adhesion of colored paints laminated on the plastic member and metal member, and can contain, as primary components, a base resin such as an optionally chlorinated aqueous polyolefin-based resin, aqueous polyurethane resin, aqueous polyester resin or aqueous acrylic resin, a crosslinking agent such as a blocked polyisocyanate compound or a melamine resin, and water, and may, if necessary, further contain paint additives commonly used in the technical field of paints, such as rheology-controlling agents, organic solvents, coloring pigments, body pigments, electrically conductive pigments, anti-corrosion pigments, pigments dispersing agents and plasticizers. It is possible to use these paint additives either separately, or in combination of two or more thereof.

The primer paint (P) can be applied on the substrate using an already known method, such as air spray coating, airless spray coating, rotary atomization coating or curtain coating, and an electrostatic charge may be applied during the coating. Of these, a method such as air spray coating or rotary atomization coating is preferred.

The coating amount of the primer paint (P) is an amount at which the thickness of a hot cured film is 2 to 15 µm, and particularly preferably 5 to 10 µm.

The obtained primer coating film may, if necessary, for example, be subjected to pre-heating, air blowing, or the like, at a temperature of approximately 50° C. to approximately 90° C. for a period of 1 to 60 minutes.

Step (2)

In step (2) in the present invention, an aqueous first colored paint (X) is applied on the uncured primer coating film obtained in step (1) so as to form an uncured first colored coating film.

Aqueous First Colored Paint (X)

The aqueous first colored paint (X) is a 1-package type paint composition containing a hydroxyl group-containing resin (X1) and a blocked polyisocyanate compound (X2), and may be an already known paint that is commonly used for coating automobile bodies.

The hydroxyl group-containing resin (X1) include, for example, polyester resins, acrylic resins and urethane resins and the like having an acid group in the molecule and also having a hydroxyl group in order to generally render the resin water-soluble or water-dispersible when neutralized with a basic compound.

Such polyester resins can be prepared by means of an esterification reaction between a polybasic acid and a polyhydric alcohol. The polybasic acid is a compound having 2 or more carboxyl groups per molecule, and include, for example, aromatic dicarboxylic acids and anhydrides thereof, such as terephthalic acid, isophthalic acid, phthalic acid, naphthalenedicarboxylic acid, 4,4'-biphenyldicarboxylic acid and diphenylmethane-4,4'-dicarboxylic acid; alicyclic dicarboxylic acid and anhydrides thereof, such as hexahydroisophthalic acid, hexahydroterephthalic acid, hexahydrophthalic acid and tetrahydrophthalic acid; aliphatic dicarboxylic acids and anhydrides thereof, such as adipic acid, sebacic acid, suberic acid, succinic acid, glutaric acid, maleic acid, chloromaleic acid, fumaric acid, dodecanedioic acid, pimelic acid, azelaic acid, itaconic acid, citraconic acid and dimer acids; lower alkyl esters, such as methyl esters and ethyl esters, of these dicarboxylic acids; and tribasic or higher polybasic acids, such as trimellitic acid, trimellitic anhydride, pyromellitic acid, pyromellitic anhydride, trimesic acid, methylcyclohexenetricarboxylic acid, tetrachlorohexenetricarboxylic acid and anhydrides thereof.

The polyhydric alcohol is a compound having 2 or more hydroxyl groups per molecule, and include, for example, dihydric alcohols such as ethylene glycol, propylene glycol, diethylene glycol, trimethylene glycol, tetraethylene glycol, triethylene glycol, dipropylene glycol, 1,4-butane diol, 1,3-butane diol, 2,3-butane diol, 1,2-butane diol, 3-methyl-1,2-butane diol, 2-butyl-2-ethyl-1,3-propane diol, 1,2-pentane diol, 1,5-pentane diol, 1,4-pentane diol, 2,4-pentane diol, 2,3-dimethyltrimethylene glycol, tetramethylene glycol, 3-methyl-4,3-pentane diol, 3-methyl-4,5-pentane diol, 2,2,4-trimethyl-1,3-pentane diol, 1,6-hexane diol, 1,5-hexane diol, 1,4-hexane diol, 2,5-hexane diol, neopentyl glycol, hydroxypivalic acid and neopentyl glycol esters; polylactone diols obtained by adding a lactones such as ε-caprolactone to these dihydric alcohols; ester diols such as bis(hydroxyethyl) terephthalate: polyether diols such as alkylene oxide adducts of bisphenol A, polyethylene glycol, polypropylene glycol and polybutylene glycol; trihydric or higher alcohols such as glycerin, trimethylolpropane, trimethylolethane, diglycerol, triglycerol, 1,2,6-hexane triol, pentaerythritol, dipentaerythritol, sorbitol and mannitol; polylactone polyols obtained by adding a lactones such as ε-caprolactone to these trihydric or higher alcohols; and alicyclic polyhydric alcohols such as 1,4-cyclohexane dimethanol, tricyclodecane dimethanol, hydrogenated bisphenol A and hydrogenated bisphenol F. In addition, alcohol compounds obtained by reacting an acid with an α-olefin epoxide such as propylene oxide and butylene oxide, a monoepoxy compound such as "Cardura E10" (product name, available from Japan Epoxy Resins Co., Ltd. (now Mitsubishi Chemical Corporation), a glycidyl ester of a synthetic highly branched saturated fatty acid) and the like can be introduced into a polyester resin.

The acrylic resin can generally be synthesized by copolymerizing a carboxyl group-containing unsaturated monomer, a hydroxyl group-containing unsaturated monomer and another copolymerizable unsaturated monomer by means of an ordinary method such as emulsion polymerization or solution polymerization.

Carboxyl group-containing unsaturated monomers include, for example, acrylic acid, methacrylic acid, crotonic acid, itaconic acid, maleic acid, maleic anhydride and the like. It is possible to use these carboxyl group-containing unsaturated monomers either separately or in combination of two or more thereof.

A monoester of, for example, (meth)acrylic acid and a dihydric alcohol having 2 to 10 carbon atoms is suitable as the hydroxyl group-containing unsaturated monomer, and include, for example, 2-hydroxyethyl (meth)acrylate, 2-hydroxypropyl (meth)acrylate and 4-hydroxybutyl (meth)acrylate.

Moreover, in the present specification, "(meth)acrylate" means acrylate or methacrylate, "(meth)acrylic acid" means acrylic acid or methacrylic acid, and "(meth)acryloyl" means acryloyl or methacryloyl.

In addition to the compounds mentioned above, for example, compounds obtained by additionally ring-opening polymerizing ε-caprolactone or the like to a monoester of (meth)acrylic acid and a dihydric alcohol having 2 to 10 carbon atoms; or polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, monohydroxyethyl phthalate (meth)acrylate and the like can be used as the above-mentioned monoesters of (meth)acrylic acid and a polyhydric alcohol.

The other copolymerizable unsaturated monomer include, for example, monoesters of acrylic acid or methacrylic acid and a monohydric alcohol having 1 to 20 carbon atoms, such as methyl (meth)acrylate, ethyl acrylate, ethyl (meth)acrylate, propyl (meth)acrylate, n-butyl (meth)acrylate, iso-butyl (meth)acrylate, tert-butyl (meth)acrylate, 2-ethylhexyl (meth)acrylate, isooctyl (meth)acrylate, isomyristyl (meth)acrylate, isostearyl acrylate (available from Osaka Organic Chemical Industry Ltd., product name), cyclohexyl (meth)acrylate, lauryl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, tridecyl (meth)acrylate, stearyl (meth)acrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate and tetrahydrofurfuryl (meth)acrylate; aromatic unsaturated monomers such as styrene, α-methylstyrene and vinyltoluene; vinyl acetate, vinyl propionate, vinyl chloride and VEOVA 9 and VEOVA 10 (available from Japan Epoxy Resins Co., Ltd.), which are vinyl versatate esters, and it is possible to use 1 or 2 or more unsaturated monomers.

The urethane resin has a carboxyl group in the molecule in order to impart water dispersibility, and a method of using a combination of a polyol not having a carboxyl group and a carboxyl group-containing polyol and reacting these polyols with a diisocyanate so as to introduce a carboxyl group into the urethane backbone is commonplace as a method for introducing a carboxyl group into a urethane resin.

In cases where, for example, a low molecular weight polyol is used as the polyol that does not contain a carboxyl group, it is possible to use the above-mentioned polyhydric alcohols that are used when synthesizing the polyester. In addition, high molecular weight polyols include polyether polyols, polyester polyols, acrylic polyols, epoxy polyols, and the like. Polyether polyols include polyethylene glycol, polypropylene glycol, polytetramethylene glycol and the like. Other examples include lactone-based ring-opened polymer polyols, such as polycaprolactone, polycarbonate diols and the like.

Carboxyl group-containing polyols include, for example, 2,2-dimethylolpropionic acid, 2,2-dimethylolbutanoic acid and the like, but 2,2-dimethylolpropionic acid is particularly preferred. When using these, a small quantity of a solvent such as N-methylpyrrolidone can be used in order for the reaction to progress rapidly. The usage quantity of this type of carboxyl group-containing polyol is preferably 5 to 30 parts by weight relative to 100 parts by weight of the polyol that does not contain a carboxyl group from the perspectives of water dispersibility and coating film water resistance.

In addition, it is possible to react a hydroxyl group-containing radical-polymerizable unsaturated monomer with the polyols (the polyol that does not contain a carboxyl group and/or carboxyl group-containing polyol mentioned above) and a polyisocyanate compound so as to introduce a radical-polymerizable unsaturated group into the urethane resin. This hydroxyl group-containing radical-polymerizable unsaturated monomer include 2-hydroxyethyl (meth)acrylate, 2-hydroxypropyl (meth)acrylate, 4-hydroxybutyl (meth)acrylate and the like.

The above-mentioned polyisocyanate compounds include, for example, aliphatic polyisocyanates such as hexamethylene diisocyanate, trimethylhexamethylene diisocyanate, dimer acid diisocyanates and lysine diisocyanate; biuret type adducts and isocyanurate ring adducts of these polyisocyanates; alicyclic diisocyanates such as isophorone diisocyanate, 4,4'-methylene-bis(cyclohexyl isocyanate), methylcyclohexane-2,4-diisocyanate, methylcyclohexane-2,6-diisocyanate, 1,3-di(isocyanatomethyl)cyclohexane, 1,4-di(isocyanatomethyl)cyclohexane, 1,4-cyclohexane diisocyanate, 1,3-cyclopentane diisocyanate and 1,2-cyclohexene diisocyanate; biuret type adducts and isocyanurate ring adducts of these polyisocyanates; aromatic diisocyanate compounds such as xylylene diisocyanate, meta-xylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, m-phenylene diisocyanate, p-phenylene diisocyanate, 4,4'-biphenylene diisocyanate, 3,3'-dimethyl-4,4'-biphenylene diisocyanate, bis(4-isocyanatophenyl)sulfone and isopropylidene-bis(4-phenylisocyanate); biuret type adducts and isocyanurate ring adducts of these polyisocyanates; polyisocyanates having 3 or more isocyanate groups per molecule, such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate; biuret type adducts and isocyanurate ring adducts of these polyisocyanates; urethanation adducts obtained by reacting a polyisocyanate compound with a hydroxyl group in a polyol such as ethylene glycol, propylene glycol, 1,4-butylene glycol, dimethylolpropionic acid, a polyalkylene glycol, trimethylolpropane or hexane triol at proportions whereby there is an excess of isocyanate groups; biuret type adducts and isocyanurate ring adducts of these polyisocyanates and the like.

From perspectives such as curing properties, it is generally preferable for the hydroxyl group-containing resin (X1) to have a hydroxyl value within the range of 10 to 150 mg KOH/g, and especially 30 to 100 mg KOH/g. In addition, from perspectives such as water dispersibility, it is generally preferable for the hydroxyl group-containing resin (X1) to have an acid value within the range of 10 to 150 mg KOH/g, and especially 20 to 100 mg KOH/g.

The hydroxyl group-containing resin (X1) can be rendered water-soluble or water-dispersible by neutralizing acid groups such as carboxyl groups in the resin molecule with a basic compound.

Basic compounds can include, for example, alkali metal and alkaline earth metal hydroxides such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n-propanolamine, di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyamines such as diethylenetriamine, hydroxyethylaminoethylamine, ethylaminoethylamine and methylaminopropylamine. The usage quantity of the basic compound is within the range of 0.1 to 1.5 equivalents, and preferably 0.2 to 1.2 equivalents, relative to the quantity of acid groups in the hydroxyl group-containing resin.

The blocked polyisocyanate compound (X2) is a compound in which an isocyanate group in a polyisocyanate compound having at least 2 free isocyanate groups per molecule is blocked with a blocking agent.

Polyisocyanate compounds in blocked polyisocyanate compounds can include, for example, aliphatic polyisocyanates, such as hexamethylene diisocyanate, trimethylhexamethylene diisocyanate, dimer acid diisocyanates, lysine diisocyanate; biuret type adducts and isocyanurate ring adducts of these polyisocyanates; alicyclic diisocyanates such as isophorone diisocyanate, 4,4'-methylene-bis(cyclohexyl isocyanate), methylcyclohexane-2,4- (or -2,6-) diisocyanate, 1,3- (or 1,4-)di(isocyanatomethyl)cyclohexane, 1,4-cyclohexane diisocyanate, 1,3-cyclopentane diisocyanate and 1,2-cyclohexane diisocyanate; biuret type adducts and isocyanurate ring adducts of these polyisocyanates; aromatic diisocyanate compounds such as xylylene diisocyanate, meta-xylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-)phenylene diisocyanate, 4,4'-biphenylene diisocyanate, 3,3'-dimethyl-4,4'-biphenylene diisocyanate, bis(4-isocyanatophenyl)sulfone and isopropylidene-bis(4-phenylisocyanate); biuret type adducts and isocyanurate ring adducts of these polyisocyanates; polyisocyanates having at least 3 isocyanate groups per molecule, such as triphenylmethane-4,4',4"-triisocyanate, 1,3,5-triisocyanatobenzene, 2,4,6-triisocyanatotoluene and 4,4'-dimethyldiphenylmethane-2,2',5,5'-tetraisocyanate; biuret type adducts and isocyanurate ring adducts of these polyisocyanates; urethanation adducts obtained by reacting a polyisocyanate compound with a hydroxyl group in a polyol such as ethylene glycol, propylene glycol, 1,4-butylene glycol, dimethylolpropionic acid, a polyalkylene glycol, trimethylolpropane or hexane triol at proportions whereby there is an excess of isocyanate groups; and biuret type adducts and isocyanurate ring adducts of these polyisocyanates. It is possible to use these polyisocyanate compounds either separately, or in combination of two or more thereof.

The blocking agent can include, for example, phenol-based compounds such as phenol, cresol, xylenol, nitrophenol, ethylphenol, hydroxydiphenyl, butylphenol, isopropylphenol, nonylphenol, octylphenol and methyl hydroxybenzoate; lactam-based compounds such as ε-caprolactam, δ-valerolactam, γ-butyrolactam and β-propiolactam; aliphatic alcohols such as methanol, ethanol, propyl alcohol, butyl alcohol, amyl alcohol and lauryl alcohol; ether compounds such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether and methoxymethanol; oxime compounds such as formamide oxime, acetamide oxime, acetoxime, methyl ethyl ketooxime, diacetyl monooxime, benzophenone oxime and cyclohexane oxime; active methylene compounds such as dimethyl malonate, diethyl malonate, ethyl acetoacetate, methyl acetoacetate and acetyl acetone; amine compounds such as diphenylamine, phenylnaphthylamine, xylidine, N-phenylxylidine, carbazole, aniline, naphthylamine, butylamine, dibutylamine and butylphenylamine; imidazole-based compounds such as imidazole and 2-ethylimidazole; pyrazole-based compounds such as 3,5-dimethylpyrazole; urea-based compounds such as urea, thiourea, ethylene urea, ethylene thiourea and diphenyl urea; carbamic acid ester compounds such as phenyl N-phenylcarbamate; and imine-based compounds such as ethyleneimine and propyleneimine. It is possible to use these blocking agents either separately, or in combination of two or more thereof.

From perspectives such as low temperature curing properties, a pyrazole blocked polyisocyanate compound can be used particularly advantageously as the blocked polyisocyanate compound (X2).

The content ratio of the hydroxyl group-containing resin (X1) and the blocked polyisocyanate compound (X2) is generally 40 to 90 mass %, and preferably 50 to 80 mass %, of the former and generally 60 to 10 mass %, and preferably 50 to 20 mass %, of the latter relative to the total quantity of solid content in both components.

The aqueous first colored paint (X) may, if necessary, contain a crosslinking agent other than the blocked polyisocyanate compound (X2). From perspectives such as water resistance of an obtained coating film, this type of crosslinking agent is preferably a melamine resin able to react with a hydroxyl group or a carbodiimide group-containing compound able to react with a carboxyl group, and is particularly preferably a melamine resin.

The aqueous first colored paint (X) may contain a pigment such as a coloring pigment or body pigment and may, if necessary, contain common paint additives, such as pigment dispersing agents, curing catalysts, thickening agents, ultraviolet radiation absorbers, photostabilizers, anti-foaming agents, plasticizers, organic solvents, surface modification agents and anti-settling agents. It is possible to use these paint additives either separately, or in combination of two or more thereof. The aqueous first colored paint (X) may be obtained by dissolving or dispersing the components mentioned above in an aqueous medium to form a paint.

The aqueous first colored paint (X) can be coated on the uncured primer coating film using an already known method, such as air spray coating, airless spray coating, rotary atomization coating or curtain coating, and an electrostatic charge may be applied during the coating. Of these, a method such as air spray coating or rotary atomization coating is preferred.

The coating amount of the aqueous first colored paint (X) is an amount at which the thickness of a cured film is 10 to 40 μm, and particularly preferably 15 to 30 μm.

The first colored coating film derived from the obtained aqueous first colored paint (X) may, if necessary, for example, be subjected to pre-heating, air blowing, or the like, at a temperature of approximately 50° C. to approximately 110° C., and preferably approximately 60° C. to approximately 90° C., for a period of 1 to 60 minutes.

Step (3)

In the present invention, an aqueous second colored paint (Y) is coated on the uncured first colored coating film obtained in step (2) so as to form an uncured second colored coating film.

Aqueous Second Colored Paint (Y)

The aqueous second colored paint (Y) is a 1-package type paint composition containing a hydroxyl group-containing resin (Y1) and a blocked polyisocyanate compound (Y2), and is generally used to impart a substrate with an excellent appearance.

The aqueous second colored paint (Y) contains the hydroxyl group-containing resin (Y1) and the blocked polyisocyanate compound (Y2) as essential resin components, if necessary, further contain pigments, other resin components, organic solvents, thickening agents, anti-settling agents, curing catalysts, pigment dispersing agents, ultraviolet radiation absorbers, photostabilizers, surface modification agents, anti-foaming agents, plasticizers, and the like, and may be obtained by dissolving or dispersing these components in an aqueous medium to form a paint.

The resins illustrated for the hydroxyl group-containing resin (X1) can be used as appropriate as the hydroxyl group-containing resin (Y1), and the compounds illustrated for the blocked polyisocyanate compound (X2) can be used as appropriate as the blocked polyisocyanate compound (Y2).

The content ratio of the hydroxyl group-containing resin (Y1) and the blocked polyisocyanate compound (Y2) is generally 40 to 90 mass %, and preferably 50 to 80 mass %, of the former and generally 60 to 10 mass %, and preferably 50 to 20 mass %, of the latter relative to the total quantity of solid content in both components.

Coloring pigments, effect pigments, and the like, can be used as the pigments mentioned above. Coloring pigments include, for example, titanium oxide, hydrozincite, carbon black, molybdenum red, Prussian blue, cobalt blue, azo-based pigments, phthalocyanine-based pigments, quinacridone-based pigments, isoindoline-based pigments, indanthrene (anthraquinone)-based pigments, perylene-based pigments, dioxazine-based pigments, diketopyrrolopyrrole-based pigments, and it is possible to use these coloring pigments and the like, and each of them can be used alone, or in combination of two or more thereof. In addition, effect pigments include, for example, aluminum (including vapor deposited aluminum), copper, zinc, brass, nickel, aluminum oxide, mica, aluminum oxide coated with titanium oxide or iron oxide, mica coated with titanium oxide or iron oxide, glass flakes and hologram pigments, and it is possible to use these effect pigments either separately, or in combination of two or more thereof. The effect pigment is preferably flaky.

The aqueous second colored paint (Y) can be coated on of the uncured first colored coating film using an already known method, such as air spray coating, airless spray coating, rotary atomization coating or curtain coating, and an electrostatic charge may be applied during the coating. Of these, a method such as air spray coating or rotary atomization coating is preferred.

From perspectives such as smoothness and distinctness of image of an obtained multilayer coating film, the coating amount of the aqueous second colored paint (Y) is an amount at which the thickness of a cured film is 8 to 18 μm, and particularly preferably 10 to 15 μm. In cases where the aqueous second colored paint (Y) contains an effect pigment in particular, if the coating amount falls within the range mentioned above, the effect pigment is aligned in the second colored coating film and it is possible to obtain an excellent appearance in design having a sense of sparkling photoluminescence or interference colors.

The aqueous second colored paint (Y) can be coated on of the uncured first colored coating film using an already known method, such as air spray coating, airless spray coating, rotary atomization coating or curtain coating, and an electrostatic charge may be applied during the coating. Of these, a method such as air spray coating or rotary atomization coating is preferred.

The coating amount of the aqueous second colored paint (Y) is an amount at which the thickness of a cured film is 5 to 30 μm, and particularly preferably 10 to 20 μm.

The second colored coating film derived from the obtained aqueous second colored paint (Y) may, if necessary, for example, be subjected to pre-heating, air blowing, or the like, at a temperature of approximately 50° C. to approximately 110° C., and preferably approximately 60° C. to approximately 90° C., for a period of 1 to 60 minutes.

Step (4)

In the method of the present invention, a clear paint (Z) is applied on the uncured second colored coating film obtained in step (3) so as to form an uncured clear coating film.

Clear Paint (Z)

The clear paint (Z) used in the method of the present invention is a 2-package type paint composition which contains a hydroxyl group-containing resin (Z1), an aliphatic polyisocyanate compound and/or a derivative thereof (Z2), and a non-aqueous polymer dispersion liquid (Z3) having a hydroxyl value of substantially 0 mg KOH/g.

The hydroxyl group-containing resin (Z1) is a hydroxyl group-containing resin having a hydroxyl value of 80 to 150 mg KOH/g.

The hydroxyl group-containing resin (Z1) is not particularly limited as long as the hydroxyl value thereof falls within the range 80 to 150 mg KOH/g, and specifically includes, for example, acrylic resins, polyester resins, polyether resins, polyurethane resins and the like, and hydroxyl group-containing acrylic resins are particularly preferred.

A hydroxyl group-containing acrylic resin can be produced by copolymerizing a hydroxyl group-containing unsaturated monomer (M-1) and another copolymerizable unsaturated monomer (M-2) using an ordinary method.

The hydroxyl group-containing unsaturated monomer (M-1) is a compound having 1 hydroxyl group and 1 unsaturated bond per molecule, and this hydroxyl group acts mainly as a functional group that reacts with a crosslinking agent. Specifically, a monoester of acrylic acid or methacrylic acid and a dihydric alcohol having 2 to 10 carbon atoms is preferred as this type of monomer, and include, for example, 2-hydroxyethyl (meth)acrylate, hydroxypropyl (meth)acrylate, hydroxybutyl (meth)acrylate and the like. In addition, other examples of monoesters of the polyhydric alcohols listed above and acrylic acid or methacrylic acid can include compounds obtained by ring opening condensation of ε-caprolactone, such as "Placcel FA-1", "Placcel FA-2", "Placcel FA-3", "Placcel FA-4", "Placcel FA-5", "Placcel FM-1", "Placcel FM-2", "Placcel FM-3", "Placcel FM-4" and "Placcel FM-5" (these products are all available from Daicel Corporation).

The blending proportion of the hydroxyl group-containing unsaturated monomer (M-1) is 20 to 50 mass %, and particularly preferably 25 to 45 mass %, relative to the overall quantity of the monomer mixture.

The other copolymerizable unsaturated monomer (M-2) is a compound having 1 unsaturated bond per molecule, other than the hydroxyl group-containing unsaturated monomer (M-1), and include, for example, carboxyl group-containing unsaturated monomers such as (meth)acrylic acid, crotonic acid, itaconic acid, maleic acid and maleic anhydride; sulfone group-containing unsaturated monomers such as vinylsulfonic acid and sulfoethyl (meth)acrylate; acidic phosphoric acid ester-based unsaturated monomers such as 2-(meth)acryloyloxyethyl acid phosphate, 2-(meth)acryloyloxypropyl acid phosphate, 2-(meth)acryloyloxy-3-chloropropyl acid phosphate and 2-methacryloyloxyethylphenylphosphoric acid; monoesters of acrylic acid or methacrylic acid and a monohydric alcohol having 1 to 20 carbon atoms, such as methyl (meth)acrylate, ethyl acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, isooctyl (meth)acrylate, isomyristyl (meth)acrylate, isostearyl acrylate (available from Osaka Organic Chemical Industry Ltd., product name), cyclohexyl (meth)acrylate, lauryl (meth)acrylate, isobornyl (meth)acrylate, tricyclodecanyl (meth)acrylate, adamantyl (meth)acrylate, 3,5-dimethyladamantyl (meth)acrylate, 3-tetracyclododecyl methacrylate, tridecyl (meth)acrylate, stearyl (meth)acrylate, 4-methylcyclohexylmethyl (meth)acrylate, 4-ethylcyclohexylmethyl (meth)acrylate, 4-methoxycyclohexylmethyl (meth)acrylate, tert-butylcyclohexyl (meth)acrylate, cyclooctyl (meth)acrylate, cyclododecyl (meth)acrylate and tetrahydrofurfuryl (meth)acrylate; aromatic unsaturated monomers such as styrene, α-methylstyrene and vinyltoluene; vinyl acetate, vinyl propionate, vinyl chloride and VEOVA 9 and VEOVA 10 (available from Japan Epoxy Resins Co., Ltd.), which are vinyl versatate esters, and it is possible to use one or two or more of them.

The copolymerization method used to obtain the hydroxyl group-containing acrylic resin by copolymerizing the monomer mixture mentioned above is not particularly limited, and it is possible to use an already known copolymerization method, but of these, a solution polymerization method in which polymerization is carried out in an organic solvent in the presence of a polymerization initiator can be advantageously used.

Organic solvents used when carrying out this solution polymerization method include, for example, aromatic solvents such as toluene, xylene and Swasol 1000 (product name, available from Cosmo Oil Co., Ltd., high boiling point petroleum-based solvent); ester-based solvents such as ethyl acetate, 3-methoxybutyl acetate, ethylene glycol ethyl ether acetate and propylene glycol methyl ether acetate; ketone-based solvents such as methyl ethyl ketone, methyl isobutyl ketone and methyl amyl ketone; propyl propionate, butyl propionate, ethoxyethyl propionate and the like. It is possible to use these organic solvents alone, or in combination of two or more of them.

Polymerization initiators able to be used when copolymerizing the hydroxyl group-containing acrylic resin can include, for example, already known radical polymerization initiators such as 2,2'-azobisisobutyronitrile, benzoyl peroxide, di-t-butyl peroxide, di-t-amyl peroxide, t-butyl peroctoate and 2,2'-azobis(2-methylbutyronitrile).

The hydroxyl value of the hydroxyl group-containing resin is within the range of 80 to 150 mg KOH/g, and more preferably 100 to 150 mg KOH/g. If the hydroxyl value is less than 80 mg KOH/g, the crosslinking density is low, meaning that impact resistance may be inadequate. In addition, if the hydroxyl value exceeds 150 mg KOH/g, the water resistance of a coating film may deteriorate.

The aliphatic polyisocyanate compound and/or derivative thereof (Z2) include, for example, aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate; for example, aliphatic triisocyanates such as lysine ester triisocyanates, 1,4,8-triisocyanatooctane, 1,6,11-triisocyanatoundecane, 1,8-diisocyanato-4-isocyanatomethyloctane, 1,3,6-triisocyanatohexane and 2,5,7-trimethyl-1,8-diisocyanato-5-isocyanatomethyloctane; and derivatives of these include, for example, dimers, trimers, biurets, allophanates, carbodiimides, uretdiones, uretimines, isocyanurates and the like of these polyisocyanate compounds described above. It is possible to use these compounds alone, or in combination of two or more thereof.

In the clear paint (Z), the ratio of isocyanate groups in the aliphatic polyisocyanate compound and/or derivative thereof (Z2) relative to hydroxyl groups in the hydroxyl group-containing resin (Z1) (NCO/OH) is within the range of 0.9 to 1.2, and more preferably 0.9 to 1.1.

The non-aqueous polymer dispersion liquid (Z3) is present discontinuously in the clear coating film, has the function of facilitating self-breaking of the clear coating film and improving impact resistance, has a hydroxyl value of substantially 0 mg KOH/g, and is generally a non-aqueous dispersion liquid of polymer particles obtained by dispersion polymerization of at least one type of unsaturated monomer in the presence of a polymer dispersion stabilizer and an organic solvent.

The polymer dispersion stabilizer used when producing component (Z3) is generally a polymer obtained by copolymerizing another unsaturated monomer as needed with a long chain unsaturated monomer.

The long chain unsaturated monomer used in this polymer can be selected as appropriate according to the performance required of the coating film, but the long chain unsaturated monomers listed below can be advantageously used from perspectives such as copolymerization properties and solubility in organic solvents.

Examples include a $C_{4-18}$ alkyl or cycloalkyl ester of (meth)acrylic acid, such as n-butyl (meth)acrylate, isobutyl (meth)acrylate, t-butyl (meth)acrylate, 2-ethylhexyl (meth)acrylate, cyclohexyl (meth)acrylate, n-octyl (meth)acrylate, lauryl (meth)acrylate, tridecyl (meth)acrylate and stearyl (meth)acrylate; alkoxyalkyl esters of (meth)acrylic acid, such as methoxybutyl (meth)acrylate, methoxyethyl (meth)acrylate and ethoxybutyl (meth)acrylate; esters of (meth)acrylic acid of aromatic alcohols such as benzyl (meth)acrylate; adducts of monocarboxylic acid compounds, such as capric acid, lauric acid, linoleic acid and oleic acid, and glycidyl (meth)acrylate or hydroxyalkyl esters of (meth)acrylic acid; adducts of (meth)acrylic acid and monoepoxy compounds such as "Cardura E10"; vinyl aromatic compounds such as styrene, α-methylstyrene, vinyltoluene, p-chlorostyrene and p-t-butylstyrene; mono- or di-ester compounds of α,β-unsaturated carboxylic acids other than (meth)acrylic acid, such as itaconic acid, itaconic anhydride, crotonic acid, maleic acid, maleic anhydride, fumaric acid and citraconic acid, and $C_{4-18}$ monoalcohols, such as butyl alcohol, pentyl alcohol, heptyl alcohol, octyl alcohol and stearyl alcohol; and fluorine atom-containing compounds such as "Viscoat 8F", "Viscoat 8FM", "Viscoat 3F", "Viscoat 3FM" (these products are all (meth)acrylate compounds having fluorine atoms in side chains, and are available from Osaka Organic Chemical Industry Ltd.), perfluorocyclohexyl (meth)acrylate and perfluorohexylethylene.

The unsaturated monomer other than a long chain unsaturated monomer used as needed when polymerizing the polymer dispersion stabilizer is not particularly limited as long as this monomer is an unsaturated monomer other than the long chain unsaturated monomers listed above, but can include, for example, $C_{1-3}$ alkyl esters of (meth)acrylic acid, such as methyl (meth)acrylate, ethyl (meth)acrylate and propyl (meth)acrylate; adducts of glycidyl (meth)acrylate and $C_{2-3}$ monocarboxylic acid compounds such as acetic acid or propionic acid; mono- or di-ester compounds of α,β-unsaturated carboxylic acids other than (meth)acrylic acid, such as itaconic acid, itaconic anhydride, crotonic acid, maleic acid, maleic anhydride, fumaric acid and citraconic acid, and $C_{1-3}$ monoalcohols, such as methyl alcohol or propyl alcohol; cyano group-containing unsaturated compounds such as (meth)acrylonitrile; vinyl ester compounds such as vinyl acetate; vinyl ether compounds such as ethyl vinyl ether and methyl vinyl ether; and α-olefin-based compounds such as ethylene, propylene, vinyl chloride, vinylidene chloride and the like.

It is generally possible to use a radical polymerization initiator in the polymerization used to produce the polymer dispersion stabilizer described above. Radical polymerization initiators include, for example, azo type initiators such as 2,2'-azobisisobutyronitrile and 2,2'-azobis(2,4-dimethylvaleronitrile); peroxide type initiators such as benzoyl peroxide, lauryl peroxide, t-butyl peroctoate, t-butylperoxy-2-ethylhexanoate, and the like, and these polymerization initiators can generally be used within a range of about 0.2 to 10 parts by mass, and preferably 0.5 to 5 parts by mass, relative to 100 parts by mass of the monomers being polymerized. The reaction temperature during the polymerization is generally approximately 60° C. to 160° C., and the polymerization reaction duration is generally approximately 1 to 15 hours.

The molecular weight of the copolymer used as the dispersion stabilizer is within a range of generally a weight average molecular weight of approximately 5,000 to 100,000, and preferably approximately 5,000 to 50,000. By using a copolymer having a molecular weight within this range as the dispersion stabilizer, dispersed particles are stabilized, so that aggregation and sedimentation are suppressed, and it is possible to obtain a paint which is not too viscous for easy handling. Therefore, such copolymer is preferred.

It is possible to use one polymer dispersion stabilizer alone, or a combination of two or more types thereof. Furthermore, other dispersion stabilizers, such as butyl ether-modified melamine-formaldehyde resins and alkyd resins, may be additionally used if necessary.

When producing component (Z3), at least one type of unsaturated monomer is polymerized in an organic solvent in the presence of the polymer dispersion stabilizer so as to prepare a non-aqueous dispersion liquid of polymer particles that are insoluble in the organic solvent.

The organic solvent used in the polymerization encompasses organic solvents that do not substantially dissolve the polymer particles produced by the polymerization, but are good solvents for the polymer dispersion stabilizer and the unsaturated monomer. Specific examples of such organic solvents can include aliphatic hydrocarbon-based solvents such as hexane, heptane and octane; aromatic hydrocarbons such as benzene, toluene and xylene; alcoholic solvents such as methyl alcohol, isopropyl alcohol, n-butyl alcohol, isobutyl alcohol and octyl alcohol; ether-based solvents such as cellosolve, butylcellosolve and diethylene glycol monobutyl ether; ketone-based solvents such as methyl isobutyl ketone, diisobutyl ketone, methyl ethyl ketone, methyl hexyl ketone and ethyl butyl ketone; and ester-based solvents such as ethyl acetate, isobutyl acetate, amyl acetate and 2-ethylhexyl acetate. It is possible to use one of these organic solvents alone, or in combination of two or more types thereof.

A solvent which contains an aliphatic hydrocarbon as the primary component and which is obtained by combining this primary component as appropriate with an aromatic hydrocarbon, an alcoholic solvent, an ether-based solvent, a ketone-based solvent, an ester-based solvent, or the like, can be used particularly advantageously as the organic solvent described above.

An unsaturated monomer which exhibits excellent polymerization properties and which has fewer carbon atoms than the number of carbon atoms in the monomer used as the monomer component of the polymer dispersion stabilizer can be advantageously used as the unsaturated monomer that is polymerized as described above from the perspective of being readily formed as dispersed polymer particles.

This type of unsaturated monomer can include, for example, $C_{1-18}$ alkyl or cycloalkyl esters of (meth)acrylic acid, such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, cyclohexyl (meth)acrylate, n-octyl (meth)acrylate, lauryl (meth)acrylate, tridecyl (meth)acrylate and stearyl (meth)acrylate; alkoxyalkyl esters of (meth)acrylic acid, such as methoxybutyl (meth)acrylate, methoxyethyl (meth)acrylate and ethoxybutyl (meth)acrylate; esters of (meth)acrylic acid of aromatic alcohols such as benzyl (meth)

acrylate; adducts of glycidyl (meth)acrylate and $C_{2-18}$ monocarboxylic acid compounds such as acetic acid, propionic acid, oleic acid and p-t-butylbenzoic acid; adducts of (meth)acrylic acid and a monoepoxy compound such as "Cardura E10"; vinyl aromatic compounds such as styrene, α-methylstyrene, vinyltoluene, p-chlorostyrene and p-t-butylstyrene; mono- or di-ester compounds of α,β-unsaturated carboxylic acids other than (meth)acrylic acid, such as itaconic acid, itaconic anhydride, crotonic acid, maleic acid, maleic anhydride, fumaric acid and citraconic acid, and $C_{1-18}$ monoalcohols, such as methyl alcohol, butyl alcohol, hexyl alcohol and stearyl alcohol; fluorine atom-containing compounds such as "Viscoat 8F", "Viscoat 8FM", "Viscoat 3F", "Viscoat 3FM" (these products are all (meth)acrylate compounds having fluorine atoms in side chains, and are available from Osaka Organic Chemical Industry Ltd.), perfluorocyclohexyl (meth)acrylate and perfluorohexylethylene: cyano group-containing unsaturated compounds such as (meth)acrylonitrile; vinyl ester compounds such as vinyl acetate, vinyl benzoate and "VEOVA" (available from Shell Chemicals Japan Ltd.); vinyl ether compounds such as n-butyl vinyl ether, ethyl vinyl ether and methyl vinyl ether; polyvinyl compounds such as di(meth)acrylate of 1,6-hexane diol, tri(meth)acrylate of trimethylolpropane and divinylbenzene; α-olefin-based compounds such as ethylene, propylene, vinyl chloride and vinylidene chloride and the like.

As mentioned above, a particle component can be stably formed by using a monomer having fewer carbon atoms than the number of carbon atoms in the monomer component of the polymer dispersion stabilizer as the monomer component which forms polymer particles, but from this perspective, a (meth)acrylic acid ester compound having 8 or fewer, and preferably 4 or fewer, carbon atoms, a vinyl aromatic compound, (meth)acrylonitrile, and the like, can be used particularly advantageously. It is possible to use these unsaturated monomers alone, or in combination of two or more thereof.

A radical polymerization initiator is generally used to polymerize the unsaturated monomers described above. Radical polymerization initiators able to be used include, for example, azo type initiators such as 2,2'-azobisisobutyronitrile and 2,2'-azobis(2,4-dimethylvaleronitrile); and peroxide type initiators such as benzoyl peroxide, lauryl peroxide, t-butyl peroctoate and t-butylperoxy-2-ethylhexanoate, and these polymerization initiators can generally be used at within the range of about 0.2 to 10 parts by mass, and preferably 0.5 to 5 parts by mass, relative to 100 parts by mass of the monomers being polymerized.

The usage proportions of the polymer dispersion stabilizer and the unsaturated monomer present during the polymerization are generally such that the quantity of the unsaturated monomer is approximately 3 to 240 parts by mass, and preferably approximately 5 to 82 parts by mass, relative to 100 parts by mass of the polymer dispersion stabilizer. Furthermore, the overall concentration of the polymer dispersion stabilizer and the unsaturated monomer in the organic solvent is generally approximately 30 to 70 mass %, and preferably approximately 30 to 60 mass %.

The polymerization may be carried out using an already known method, the reaction temperature during the polymerization is generally approximately 60° C. to 160° C., and the polymerization reaction duration is generally approximately 1 to 15 hours.

By carrying out the polymerization reaction in the manner described above, it is possible to obtain a stable non-aqueous dispersion liquid of a non-aqueous dispersion type acrylic resin in which the liquid phase is a solution in which the polymer dispersion stabilizer is dissolved in the organic solvent and the solid phase is polymer particles obtained by polymerization of the unsaturated monomer. The average particle diameter of the polymer particles is generally within the range of approximately 0.1 to 1.0 μm. The average particle diameter of the polymer particles which falls within the range mentioned above is preferred, because the viscosity of the non-aqueous dispersion liquid is not excessively high and it is possible to suppress swelling and aggregation of the polymer particles when the paint is stored.

By binding the polymer dispersion stabilizer and the polymer particles in the non-aqueous dispersion liquid when producing component (Z3), it is possible to improve the storage stability and mechanical characteristics of the non-aqueous dispersion liquid. Moreover, even if this binding occurs, there is almost no apparent change in dispersed state and almost no change in the average particle diameter of the polymer particles.

As a method for binding the polymer dispersion stabilizer and the polymer particles, for example, it is possible to partially copolymerize a monomer having a functional group such as a hydroxyl group, an acid group, an acid anhydride group, an epoxy group, a methylol group, an isocyanate group, an amido group or an amino group at the stage where the polymer dispersion stabilizer is produced beforehand, and then use a monomer having a functional group such as a hydroxyl group, an acid group, an acid anhydride group, an epoxy group, a methylol group, an isocyanate group, an amido group or an amino group, which reacts with the functional group mentioned above, as the monomer component that forms the polymer particles. Combinations of these groups can include, for example, an isocyanate group and a hydroxyl group, an isocyanate group and a methylol group, an epoxy group and an acid (anhydride) group, an epoxy group and an amino group, an isocyanate group and an amido group, an acid (anhydride) group and a hydroxyl group and the like.

In addition, another method for binding the polymer dispersion stabilizer and the polymer particles comprises polymerizing the unsaturated monomer in the presence of a polymer dispersion stabilizer having a polymerizable double bond.

In addition, a further method for binding the polymer dispersion stabilizer and the polymer particles can be carried out by producing a non-aqueous dispersion liquid by introducing functional groups that do not react with each other into the polymer dispersion stabilizer and the polymer particles, and then reacting with a binding agent that binds the polymer dispersion stabilizer and the polymer particles to each other.

A non-aqueous dispersion liquid obtained in the manner described above is one in which the polymer dispersion stabilizer and the polymer particles are chemically bound to each other, and therefore exhibits excellent storage stability, and a coating film formed from the non-aqueous dispersion liquid can exhibit excellent chemical and mechanical properties.

The solid content proportion in the non-aqueous polymer dispersion liquid (Z3) in the clear paint (Z) is within the range of 20 to 30 mass %, and preferably 20 to 28 mass %, relative to the overall quantity of solid content in the hydroxyl group-containing resin (Z1) and aliphatic polyisocyanate compound and/or derivative thereof (Z2). The solid content proportion being less than 20 mass % is not preferred because there are concerns that it is not possible to facilitate self-breaking of a formed coating film to ensure impact resistance thereof. Also, this solid content proportion exceeding 30 mass % is not preferred, because a formed coating film becomes turbid and the final appearance deteriorates.

The clear paint (Z) may, if necessary, further contain paint additives commonly used in the technical field of coating films, such as organic solvents, rheology-controlling agents, curing catalysts, pigments, pigment dispersing agents, leveling agents, ultraviolet radiation absorbers, photostabilizers and plasticizers. It is possible to use these paint additives either separately, or in combination of two or more thereof.

The clear paint (Z) can be coated on of the uncured second colored coating film using an already known method, such as air spray coating, airless spray coating, rotary atomization coating or curtain coating, and an electrostatic charge may be applied during the coating. Of these, a method such as air spray coating or rotary atomization coating is preferred.

The coating amount of the clear paint (Z) is an amount at which a cured film thickness is 20 to 50 μm, and particularly preferably within the range of 25 to 40 μm.

After coating the clear paint (Z), the coated object may, if necessary, be allowed to stand at room temperature for an interval of approximately 1 to 60 minutes.

Step (5)

In the method of the present invention, the uncured primer coating film, uncured first colored coating film, uncured second colored coating film and uncured clear coating film formed in steps (1) to (4) are heated so as to simultaneously cure these 4 coating films.

For example, hot air heating, infrared radiation heating, high-frequency heating, or the like, can be used as the heating means, and the coating films can be simultaneously cured by heating for a duration of approximately 20 minutes to approximately 40 minutes at a temperature of approximately 80° C. to approximately 120° C., and preferably approximately 80° C. to approximately 100° C.

WORKING EXAMPLES

The present invention will now be explained in greater detail by means of working examples. Moreover, the scope of the present invention is in no way limited to these working examples. In addition, "parts" and "%" in the working examples means "parts by mass" and "mass %" respectively.

Production of Test Sheet

As a metal member, a zinc phosphate-treated cold rolled steel sheet (450 mm×300 mm×0.8 mm) was subjected to electrodeposition coating with a thermosetting epoxy resin-based cationic electrodeposition paint composition (product name "Elecron GT-10", available from Kansai Paint Co., Ltd.) so that a film thickness becomes 20 μm, and then heated for 30 minutes at 170° C. to cure it.

A polypropylene sheet having a thickness of 2 mm (350 mm×10 mm×2 mm) was prepared as a plastic member.

Next, the surfaces of the metal member and plastic member were degreased by wiping with a gauze containing petroleum benzine. A test sheet was obtained by aligning the thus obtained steel sheet and polypropylene sheet next to each other.

Production of Aqueous First Colored Paint

Production Example 1

A pigment dispersion paste was obtained by mixing 28.9 parts of a solution (note 1) of an aqueous polyester resin (a) (13 parts of solid resin content), 90 parts of "JR-806" (product name, available from Tayca Corporation, rutile titanium dioxide), 1 part of "Carbon MA-100" (product name, available from Mitsubishi Chemical Corporation, carbon black) and 42.4 parts of deionized water, adjusting the pH to 8.0 by means of 2-(dimethylamino)ethanol, and then dispersing in a paint shaker for 30 minutes. Next, 162.3 parts of the obtained pigment dispersion paste (13 parts of solid aqueous polyester resin content), 26.7 parts of the aqueous polyester resin (a) (12 parts of solid resin content), 88.9 parts (note 2) of an aqueous acrylic resin (b) (40 parts of solid resin content), 35.7 parts of "Duranate SBN-70D" (product name, available from Asahi Kasei Chemicals Corp., pyrazole blocked polyisocyanate, solid content 70%) (25 parts of solid resin content), 11 parts of "Cymel 327" (product name, available from Nippon Cytec Industries, melamine resin, solid content 90%) (10 parts of solid resin content) and 65 parts of deionized water were homogeneously mixed. An aqueous first colored paint (X-1) having a pH of 8.2, a solid paint content of 47% and a viscosity of 30 seconds at a temperature of 20° C. using a No. 4 Ford cup was obtained by adding, to the obtained mixture, "Primal ASE-60" (product name, available from Rohm and Haas Company, thickening agent), 2-(dimethylamino)ethanol and deionized water.

(note 1) Solution of aqueous polyester resin (a): 193 parts of hexahydrophthalic anhydride, 208 parts of isophthalic acid, 183 parts of adipic acid, 376 parts of neopentyl glycol and 122 parts of trimethylolpropane were charged in a reaction vessel equipped with a temperature gauge, a thermostat, a stirring device, a reflux condenser and a water separator and heated over a period of 3 hours so as to raise its temperature from 160° C. to 230° C. Next, a temperature of 230° C. was maintained while distilling off generated water by means of the water separator, and a condensation reaction was allowed to progress until the acid value reached 3 mg KOH/g or less. Next, in order to add carboxyl groups to the obtained condensation reaction product, 30 parts of trimellitic anhydride was further added and was allowed to react for 30 minutes at 170° C. Then, cooled it to 60° C. or lower, added 2-(dimethylamino)ethanol at a quantity of 0.9 equivalents relative to the acid groups, and gradually adding deionized water after neutralization of the reaction, then an aqueous polyester resin (a) having a hydroxyl value of 125 mg KOH/g, an acid value of 21 mg KOH/g, a number average molecular weight of 1300, a solid content of 45% and a pH of 7.5 was obtained.

(note 2) Aqueous acrylic resin (b): 60 parts of deionized water and 0.52 parts of "Aqualon KH-10" (product name, available from DKS Co. Ltd., polyoxyethylene alkyl ether sulfate ester ammonium salt, active ingredient: 97%) were charged in a reaction vessel equipped with a temperature gauge, a thermostat, a stirring device, a reflux condenser, a nitrogen inlet tube and a dropwise addition device, stirred and mixed in a nitrogen stream, and heated to 80° C. Next, 1% of the total quantity of the monomer emulsion described below and 5 parts of a 3% aqueous solution of ammonium persulfate were introduced into the reaction vessel and held at a temperature of 80° C. for 15 minutes. The remainder of the monomer emulsion was then added dropwise over a period of 3 hours to the reaction vessel held at the same temperature, and the contents of the reaction vessel were allowed to age for 1 hour following completion of the dropwise addition. Next, the reaction vessel was cooled to 30° C. while gradually adding 40 parts of a 5% aqueous solution of 2-(dimethylamino)ethanol to the reaction vessel, and the reaction was filtered through 100 mesh nylon cloth and its filtrate was discharged, then an acrylic emulsion aqueous acrylic resin (b) having a hydroxyl value of 39 mg KOH/g, an acid value of 12 mg KOH/g and a solid content of 45% was obtained.

Monomer Emulsion:

The monomer emulsion was obtained by mixing and stirring 50 parts of deionized water, 0.9 parts of "Aqualon KH-10", 10 parts of styrene, 20.5 parts of ethyl acrylate, 60 parts of n-butyl acrylate, 8 parts of 2-hydroxyethyl acrylate and 1.5 parts of acrylic acid.

Production Example 2

An aqueous first colored paint (X-2) was obtained in the same way as in Production Example 1, except that the entire quantity of the blocked polyisocyanate used in Production Example 1 was replaced with the melamine resin "Cymel 327".

Production of Aqueous Second Colored Paint

Production Example 3

An aqueous second colored paint (Y-1) having a pH of 8.0, a solid paint content of 25% and a viscosity of 40 seconds at 20° C. using a No. 4 Ford cup was obtained by homogeneously mixing 100 parts of an aqueous acrylic resin (c) (note 3) (30 parts of solid resin content) 78 parts of a solution of aqueous polyester resin (a) (note 1) (35 parts of solid resin content), 62 parts of an effect pigment concentrate (P-1) (note 4), 28.5 parts of "Duranate SBN-70D" (20 parts of solid resin content) and 17 parts of "Cymel 327" (15 parts of solid resin content), and then adding "Primal ASE-60" (product name, available from Rohm and Haas, thickening agent), 2-(dimethylamino)ethanol and deionized water.

(note 3) Aqueous acrylic resin (c): 130 parts of deionized water and 0.52 parts of "Aqualon KH-10" were charged in a reaction vessel equipped with a temperature gauge, a thermostat, a stirring device, a reflux condenser and a dropwise addition device, stirred and mixed in a nitrogen stream, and heated to 80° C. Next, 1% of the entire quantity of monomer emulsion (1) described below, 5.3 parts of a 6% aqueous solution of ammonium persulfate were introduced into the reaction vessel and held at a temperature of 80° C. for 15 minutes. The remainder of monomer emulsion (1) was then added dropwise over a period of 3 hours to the reaction vessel held at the same temperature, and the contents of the reaction vessel were allowed to age for 1 hour following completion of the dropwise addition. Then, monomer emulsion (2) described below was added dropwise over a period of 1 hour, and the obtained mixture was allowed to age for 1 hour, then the reaction vessel was cooled to 30° C. while adding 40 parts of a 5% aqueous solution of dimethylethanolamine to the reaction vessel, and the reaction mixture was filtered through a 100 mesh nylon cloth and its filtrate was discharged, then aqueous acrylic resin (c), which is an acrylic emulsion having an average particle diameter of 100 nm (measured at 20° C. after diluting with deionized water using a "COULTER N4" sub-micron particle size distribution measurement apparatus (product name, available from Beckman Coulter, Inc.)), an acid value of 33 mg KOH/g, a hydroxyl value of 25 mg KOH/g and a solid content concentration of 30%, was then obtained.

Monomer emulsion (1): Monomer emulsion (1) was obtained by mixing and stirring 42 parts of deionized water, 0.72 parts of Aqualon KH-10, 2.1 parts of methylene bisacrylamide, 2.8 parts of styrene, 16.1 parts of methyl methacrylate, 28 parts of ethyl acrylate and 21 parts of n-butyl acrylate.

Monomer emulsion (2): Monomer emulsion (2) was obtained by mixing and stirring 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

(note 4) Effect pigment concentrate (P-1): Effect pigment concentrate (P-1) was obtained by homogeneously mixing 19 parts of aluminum pigment paste GX-180A (product name, available from Asahi Kasei Metals Ltd., metal content 74%), 35 parts of 1-octanol (an alcoholic solvent having a boiling point of 195° C.), 8 parts of a phosphoric acid group-containing resin solution (*1) and 0.2 parts of 2-(dimethylamino)ethanol in a stirring and mixing vessel.

(*1) Phosphoric acid group-containing resin solution: A mixed solvent of 27.5 parts of methoxypropanol and 27.5 parts of isobutanol was placed in a reaction vessel equipped with a temperature gauge, a thermostat, a stirring device, a reflux condenser and a dropwise addition device and heated to 110° C., 121.5 parts of a mixture of 25 parts of styrene, 27.5 parts of n-butylmethacrylate, 20 parts of "isostearyl acrylate" (product name, available from Osaka Organic Chemical Industry Ltd., branched higher alkyl acrylate), 7.5 parts of 4-hydroxybutyl acrylate, 15 parts of a phosphoric acid group-containing polymerizable monomer (*2), 12.5 parts of 2-methacryloyloxyethyl acid phosphate, 10 parts of isobutanol and 4 parts of t-butyl peroxyoctanoate was added dropwise to the mixed solvent over a period of 4 hours, and a mixture of 0.5 parts of t-butyl peroxyoctanoate and 20 parts of isopropanol was further added dropwise over a period of 1 hour. A phosphoric acid group-containing resin solution having a solid content concentration of 50% was then obtained by stirring and aging for 1 hour. This resin had a phosphoric acid group-derived acid value of 83 mg KOH/g, a hydroxyl value of 29 mg KOH/g and a weight average molecular weight of 10,000.

(*2) Phosphoric acid group-containing polymerizable monomer: 57.5 parts of monobutyl phosphate and 41 parts of isobutanol were placed in a reaction vessel equipped with a temperature gauge, a thermostat, a stirring device, a reflux condenser and a dropwise addition device and heated to 90° C., after which 42.5 parts of glycidyl methacrylate was added dropwise over a period of 2 hours and then stirred and aged for a further 1 hour. After that, 59 parts of isopropanol was added, a phosphoric acid group-containing polymerizable monomer solution having a solid content concentration of 50% was then obtained. The obtained monomer had a phosphoric acid group-derived acid value of 285 mg KOH/g.

Production Example 4

An aqueous second colored paint (Y-2) was obtained in the same way as in Production Example 3, except that the entire quantity of the blocked polyisocyanate used in Production Example 3 was replaced with the melamine resin "Cymel 327".

Production Examples of Hydroxyl Group-containing Resin (Z1)

Production Examples 5 to 10

31 parts of ethoxyethylpropionate was charged in a four-mouthed flask equipped with a stirring device, a temperature gauge, a condenser tube and a nitrogen gas inlet port and heated to 155° C. in a nitrogen gas stream. Once a temperature of 155° C. was reached, the nitrogen gas stream was stopped and a monomer mixture for dropwise addition having a formulation of the monomers and polymerization initiator shown in Table 1 was added dropwise over a period of 4 hours. Hydroxyl group-containing resins (Z1-1) to (Z1-6) for clear paints, which had a solid content of 60%, were obtained by aging for 2 hours at a temperature of 155° C. in a nitrogen gas stream, cooling to 100° C. and then diluting with 32.5 parts of butyl acetate. The solid content concentrations (%) and resin properties of the obtained paint resins are shown in Table 1.

TABLE 1

|  |  | Production Example No. | | | | | |
|---|---|---|---|---|---|---|---|
|  |  | 5 | 6 | 7 | 8 | 9 | 10 |
|  | Hydroxyl group-containing resin No. | Z1-1 | Z1-2 | Z1-3 | Z1-4 | Z1-5 | Z1-6 |
| Dropwise-added monomer mixture | Styrene | 20 | 20 | 20 | 20 | 20 | 20 |
|  | Methyl methacrylate | 5 | 10.5 | 13 | 17.5 | 20 | 5 |
|  | Isobornyl acrylate | 30 | 30 | 30 | 30 | 30 | 30 |
|  | 2-ethylhexyl acrylate | 11 | 11.5 | 13 | 13.5 | 14 | 1 |
|  | 2-hydroxyethyl methacrylate | 34 | 28 | 24 | 19 | 16 | 44 |
|  | Di-t-amyl peroxide | 8 | 8 | 8 | 8 | 8 | 8 |
| Property values | Mass solid content concentration (%) | 60 | 60 | 60 | 60 | 60 | 60 |
|  | Weight average molecular weight | 5500 | 5500 | 5500 | 5500 | 5500 | 5500 |
|  | Hydroxyl value (mg KOH/g) | 147 | 121 | 103 | 82 | 69 | 190 |

Production of Non-aqueous Polymer Dispersion Liquid (Z3)

Production Example 11

Non-aqueous polymer dispersion liquid (Z3-1) having a hydroxyl value of substantially 0 mg KOH/g was obtained by charging 93 parts of heptane and 98 parts of a 55% solution of the polymer dispersion stabilizer described below (note 1) in a four-mouthed flask equipped with a stirring device, a temperature gauge, a condenser tube and a nitrogen gas inlet port, heating to reflux, adding mixture I of monomers and a polymerization initiator, which is explained below, dropwise over a period of 3 hours, and then aging for a further 2 hours.

Mixture I of Monomers and Polymerization Initiator

A mixture of 15 parts of styrene, 55 parts of methyl methacrylate, 30 parts of acrylonitrile and 1.5 parts of t-butylperoxy-2-ethylhexanoate.

The obtained non-aqueous polymer dispersion liquid (Z3-1) was a stable milky white low-viscosity polymer dispersion liquid having a solid content concentration of 53 mass %, a Gardener viscosity of B and an average particle diameter (as measured using an electron microscope) of 0.2 to 0.3 μm. Even after being allowed to stand for 3 months at room temperature, no occurrence of sediments or coarse particles was observed.

(Note 1) Synthesis of Polymer Dispersion Stabilizer Solution:

A polymer dispersion stabilizer solution was obtained by charging 40 parts of isobutyl acetate and 40 parts of toluene in a four-mouthed flask equipped with a stirring device, a temperature gauge, a condenser tube and a nitrogen gas inlet port, heating to reflux, adding mixture II of monomers and a polymerization initiator, which is explained below, dropwise over a period of 3 hours, and aging for a further 2 hours following the dropwise addition. The obtained polymer dispersion stabilizer solution had a solid content concentration of 55 mass %, a Gardener viscosity of G and a weight average molecular weight of 16,000.

Mixture II of Monomers and Polymerization Initiator

A mixture of 10 parts of styrene, 60 parts of isobutyl methacrylate, 30 parts of 2-ethylhexylmethacrylate and 2 parts of azobisisobutyronitrile.

Production Example 12

A non-aqueous polymer dispersion stabilizer solution (Z3-2) having a hydroxyl value of 50 mg KOH/g was obtained in the same way as in the production examples above, except that mixture I of monomers and polymerization initiator and mixture II of monomers and polymerization initiator were replaced with mixture III and mixture IV, which are explained below.

Mixture III of Monomers and Polymerization Initiator

A mixture of 15 parts of styrene, 40 parts of methyl methacrylate, 30 parts of acrylonitrile, 15 parts of 2-hydroxyethyl methacrylate and 1.5 parts of t-butylperoxy-2-ethylhexanoate.

Mixture IV of Monomers and Polymerization Initiator

A mixture of 10 parts of styrene, 49 parts of isobutyl methacrylate, 30 parts of 2-ethylhexylmethacrylate, 11 parts of 2-hydroxyethyl methacrylate and 2 parts of azobisisobutyronitrile.

Production of Clear Paint (Z)

Production Examples 13 to 19

Clear paints (Z-1) to (Z-7) were obtained by preparing main agents using the hydroxyl group-containing resins (Z1) obtained in Production Examples 5 to 10, the non-aqueous polymer dispersion liquids (Z3) obtained in Production Examples 11 and 12 and the raw materials shown in Table 2, adding a polyisocyanate compound as a curing agent according to the formulations shown in Table 2, and stirring and mixing using a Disperto form paints. Moreover, the clear paint formulations shown in Table 2 are in terms of mass ratios of each solid content, and (*5) to (*9) mean the following, respectively.

(*5) Setalux 91767 VX-60: Available from Nuplex Industries Ltd., rheology-controlling agent (*6) N-3300: Available from Sumika Bayer Urethane Co., Ltd., hexamethylene diisocyanate, solid content 100%, NCO content 21.8%

(*7) UV1164: Available from Ciba Geigy Chemical Corporation, ultraviolet radiation absorber (*8) HALS292: Available from Ciba Geigy Chemical Corporation, photostabilizer (*9) BYK-300: Product name, available from BYK Japan KK, surface modifier Through addition of butyl acetate, the obtained clear paints (Z-1) to (Z-7) as described above were adjusted to a viscosity of 25 seconds at 20° C. using a No. 4 Ford cup.

TABLE 2

| | Production Example No. | | | | | | |
|---|---|---|---|---|---|---|---|
| | 13 | 14 | 15 | 16 | 17 | 18 | 19 |
| Clear paint | Z-1 | Z-2 | Z-3 | Z-4 | Z-5 | Z-6 | Z-7 |
| Hydroxyl group-containing resin (Z1-1) | 60 | | | | | | 60 |
| Hydroxyl group-containing resin (Z1-2) | | 60 | | | | | |
| Hydroxyl group-containing resin (Z1-3) | | | 60 | | | | |
| Hydroxyl group-containing resin (Z1-4) | | | | 60 | | | |
| Hydroxyl group-containing resin (Z1-5) | | | | | 60 | | |
| Hydroxyl group-containing resin (Z1-6) | | | | | | 60 | |
| Non-aqueous polymer dispersion liquid (Z3-1) | 25 | 25 | 25 | 25 | 25 | 25 | |
| Non-aqueous polymer dispersion liquid (Z3-2) | | | | | | | 25 |
| Setalux 91767 VX-60 (note 5) | 1 | 1 | 1 | 1 | 1 | 1 | 1 |
| TINUVIN384-2 (note 6) | 2.0 | 2.0 | 2.0 | 2.0 | 2.0 | 2.0 | 2.0 |
| HALS292 (note 7) | 2.0 | 2.0 | 2.0 | 2.0 | 2.0 | 2.0 | 2.0 |
| BYK-300 (note 8) | 0.2 | 0.2 | 0.2 | 0.2 | 0.2 | 0.2 | 0.2 |
| Polyisocyanate compound (note 9) | 40 | 40 | 40 | 40 | 40 | 40 | 40 |

Production of Coated Test Sheet

Example 1

A test piece obtained by aligning a steel sheet and a polypropylene sheet next to each other was sprayed with an aqueous primer ("Ascalex 3807CD", available from Kansai Paint Co., Ltd.) so as to have a cured film thickness of 10 µm, the aqueous primer was allowed to set at room temperature for 6 minutes, after which the first colored paint (X-1) prepared in the manner described above was electrostatically applied so as to have a cured film thickness of 25 µm and allowed to set at room temperature for 6 minutes, after which the second colored paint (Y-1) prepared in the manner described above was electrostatically applied so as to have a cured film thickness of 10 µm. Next, the clear paint (Z-1) prepared in the manner described above was electrostatically applied so as to have a dried film thickness of 30 µm, allowed to stand at room temperature for 5 minutes, and then heated for 30 minutes in an oven at 120° C. so as to obtain a coated test sheet on which a multilayer coating film was formed. This multilayer coating film was subjected to the coating film performance tests described below.

Examples 2 to 4 and Comparative Examples 1 to 5

Coated test sheets on which multilayer coating films were formed were obtained in the same way as in Example 1, except that the paints shown in Table 3 were used instead of the first colored paint (X-1), second colored paint (Y-1) and clear paint (Z-1) used in Example 1. These multilayer coating films were subjected to the coating film performance tests described below.

Coating Film Performance Tests
Impact Resistance (at −30° C.):

3 panels were prepared from each coated test sheet by cutting each coated test sheet (the polypropylene sheet side) to a size of 5 cm×5 cm, and the panels were cooled for 2 hours or longer in a constant temperature box at a temperature of −30° C. A 1 kg load was set at a height of 70 cm on a DuPont impact tester, each panel was set on the tester within 5 seconds from removal from the constant temperature box, after which the load was dropped onto the panel. A case in which cracks appeared on the polypropylene sheet portion in 2 or more of the 3 panels was deemed to have failed (x), and a case in which cracks appeared on the propylene sheet portion in 1 or fewer of the 3 panels was deemed to have passed (O).

Hardness:

In accordance with JIS K 5600-5-4, a pencil lead was placed against the surface of each of coated test sheets at an angle of 45°, and the pencil lead was moved forwards by approximately 10 mm at a uniform speed while being strongly pressed against the coated test sheet surface at such a strength that the lead did not snap. The pencil hardness was deemed to be the hardness symbol of the hardest pencil at which the coating film did not break. A pencil hardness of F or greater was deemed to be a pass.

Water-resistant Adhesiveness:

Each coated test sheet was immersed for 10 days in warm water at 40° C., removed from the water and dried for 12 hours at 20° C., after which the multilayer coating film on each test piece was cut as far as the base material into a lattice-like pattern using a cutter, thereby creating 100 checkerboard squares each measuring 2 mm×2 mm. Next, cellophane tape was bonded to the surface of the test sheet, and when the cellophane tape was rapidly peeled from the test sheet at 20° C., the residual state of the checkerboard squares was investigated and evaluated according to the following criteria.

TABLE 3

| | Example | | | | Comparative Example | | | | |
|---|---|---|---|---|---|---|---|---|---|
| | 1 | 2 | 3 | 4 | 1 | 2 | 3 | 4 | 5 |
| Aqueous first colored paint (X) | X-1 | X-1 | X-1 | X-1 | X-2 | X-1 | X-1 | X-1 | X-1 |
| Aqueous second colored paint (Y) | Y-1 | Y-1 | Y-1 | Y-1 | Y-1 | Y-2 | Y-1 | Y-1 | Y-1 |
| Clear paint (Z) | Z-1 | Z-2 | Z-3 | Z-4 | Z-1 | Z-1 | Z-5 | Z-6 | Z-7 |
| Impact resistance (−30° C.) | O | O | O | O | O | O | O | X | X |
| Hardness | F | F | F | F | B | HB | B | F | F |
| Water-resistant adhesiveness | O | O | O | O | X | X | O | Δ | O |

○: 100 checkerboard squares remained
Δ: 90 to 99 checkerboard squares remained
×: 89 or fewer checkerboard squares remained

The invention claimed is:

1. A method for forming a multilayer coating film by sequentially carrying out, in order:
   (1) a step of applying a primer paint (P) on a substrate that comprises a metal material and a plastic material so as to form an uncured primer coating film;
   (2) a step of applying an aqueous first colored paint (X) on the uncured primer coating film obtained in step (1) so as to form an uncured first colored coating film;
   (3) a step of applying an aqueous second colored paint (Y) on the uncured first colored coating film obtained in step (2) so as to form an uncured second colored coating film;
   (4) a step of applying a clear paint (Z) on the uncured second colored coating film obtained in step (3) so as to form an uncured clear coating film; and
   (5) a step of heating the uncured primer coating film, the uncured first colored coating film, the uncured second colored coating film and the uncured clear coating film formed in steps (1) to (4) so as to simultaneously cure these 4 coating films,
   wherein the aqueous first colored paint (X) is a 1-package type paint composition containing a hydroxyl group-containing resin (X1) and a blocked polyisocyanate compound (X2), and the aqueous second colored paint (Y) is a 1-package type paint composition containing a hydroxyl group-containing resin (Y1) and a blocked polyisocyanate compound (Y2),
   wherein the clear paint (Z) is a 2-package type paint composition which contains a hydroxyl group-containing resin (Z1) having a hydroxyl value of 100 to 150 mg KOH/g, an aliphatic polyisocyanate compound and/or a derivative thereof (Z2), and a non-aqueous polymer dispersion liquid (Z3) having an hydroxyl value of substantially 0 mg KOH/g, and in which the solid content proportion in the non-aqueous polymer dispersion liquid (Z3) falls within a range of 20 to 30 mass % of the total quantity of solid content of the hydroxyl group-containing resin (Z1) and the aliphatic polyisocyanate compound and/or a derivative thereof (Z2), and a ratio of isocyanate groups to hydroxyl groups (NCO/OH) falls within a range of 0.9 to 1.2, and
   wherein the metal material comprises an electrodeposition paint on a surface thereof.

2. The method for forming a multilayer coating film according to claim 1, wherein the substrate that comprises a metal material and a plastic material is a substrate obtained by assembling a metal material and a plastic material.

* * * * *